United States Patent [19]

Walko, Jr.

[11] Patent Number: 5,120,165
[45] Date of Patent: Jun. 9, 1992

[54] EXCAVATION SYSTEM WITH PNEUMATIC CONVEYANCE AND SEPARATION OF EXCAVATED MATERIAL

[76] Inventor: John F. Walko, Jr., 354 McWilliams Rd., R.D. #1, Trafford, Pa. 15085

[21] Appl. No.: 518,555

[22] Filed: May 3, 1990

[51] Int. Cl.⁵ .......................................... B65G 67/20
[52] U.S. Cl. .................................. 406/40; 406/171; 406/173
[58] Field of Search .................. 406/38, 39, 40, 171, 406/172, 173, 168, 153

[56] References Cited

U.S. PATENT DOCUMENTS

| | | | |
|---|---|---|---|
| 2,580,581 | 1/1952 | Niemitz | 406/173 |
| 4,381,930 | 5/1983 | Hansen | 55/339 |
| 4,680,038 | 7/1987 | Titus | 55/302 |
| 4,695,205 | 9/1987 | Levine | 406/173 |
| 4,718,924 | 1/1988 | DeMarco | 55/302 |
| 4,776,731 | 10/1988 | Briggs et al. | 406/153 |
| 4,834,586 | 5/1989 | Depew | 406/173 |
| 4,853,011 | 8/1989 | Dyson | 55/345 |
| 4,885,012 | 12/1989 | Thompson | 406/173 |
| 4,913,597 | 4/1990 | Christianson et al. | 406/173 |
| 4,927,298 | 5/1990 | Tuszko et al. | 406/173 |
| 4,988,240 | 1/1991 | Thompson | 406/173 |

Primary Examiner—Jesus D. Sotelo
Assistant Examiner—Stephen P. Avila
Attorney, Agent, or Firm—Raymond N. Baker; John J. Byrne

[57] ABSTRACT

An Excavation System is disclosed in which fragmented excavated material is entrained in a gas and pneumatically conveyed to a desirably remote site for separation of such material from such gas. Energy is supplied to a motor to operate a gas pump to induce high velocity gas flow through a long vacuum conduit. At a vacuum intake end such flow entrains such material and conveys such material into and through such conduit to one or more separators communicating serially with the flow path for separating and collecting the excavant, then such gas is discharged into the atmosphere. At least one separator includes a high-efficiency cyclone chamber for maintaining a gas vortex for high-efficiency centrifugal separation with minimal flow-resistance. A separator is described which includes two such cyclone chambers vertically separated by a conical partition with depressed apex having an aperture with vanes for inducing a vortex in the upper chamber as such material and gas flow through the aperture from the lower cyclone chamber into the upper cyclone chamber across such vanes at such apex. The upper cyclone chamber includes a vent at the radial periphery of the vortex to discharge such separated material. The system may include a separator with settling chamber to enable gravity to separate the excavated material from the entraining gas, and collecting such material in a detachable collection region for convenient transportation to a disposal/storage site. The system may include a separator with HEPA filtering apparatus for capturing toxic dust and toxic gases, for use, for example, in toxic waste dump site clean-up. Thus the system provides for entrapping and containing excavated material, ameliorating the ecological impact of excavation.

61 Claims, 4 Drawing Sheets

EXCAVATION SYSTEM WITH PNEUMATIC CONVEYANCE AND SEPARATION OF EXCAVATED MATERIAL

This invention relates to a system for excavating materials from the earth in which such materials are pneumatically conveyed from an excavation. More particularly, in such system excavated material is entrained in a gas and pneumatically conveyed through a long enclosed flow path from an excavation site to a collection site, remote from the excavation, where such material is separated from the entraining gas and collected.

In a specific embodiment of the system, excavant (eg. dirt, dust, earth, gravel, loam, sand, aggregates, soil, fill, and other solid excavated material) is fragmented, entrained in air, and pneumatically conveyed from an excavation site to a settling chamber remote from the excavation site where larger fragments are removed and collected; then fine particles are pneumatically conveyed to a high-efficiency cyclone separator which separates the excavant particles into a collection chamber; then the segregated air is discharged through an air pump into the atmosphere.

Previously, an excavation machine would fragment excavant by scooping it into a bucket or shovel, then swing the bucket away from the excavation, and dump the excavant into a pile or a waiting truck at a remote collection site. Often several such machines worked in tandem, with one machine digging and dumping onto a pile, while another machine scooped up the loose excavant from the pile and dumped it into the open-top bucket of a waiting dump-truck. Such trucks transported the excavant to a disposal/storage site and then returned to the remote site to collect more excavant. Each step of handling undesirably discharged excavant dust into the atmosphere and spread excavant fragments in the handling area. Such dust deposited in the lungs of workers at the excavation site, affecting their health.

The discharge of dust during pre-construction work is becoming an increasing environmental concern.

Toxic waste dump clean-up efforts, prior to this invention, resulted in excavant contaminated with toxic chemicals or radioactive substances spreading into the environment. Digging and repetitively handling the excavated waste discharged toxic dust into the atmosphere and spread fragments in the handling areas; storing the waste in piles allowed wind to entrain dust into the atmosphere; and the piled and spread waste were exposed to rain, thus water percolated through the waste and carried toxic substances into waterways and underground water.

This application describes a novel combination of pneumatic apparatus and methods which provide many advantages and contributions over previous systems for transporting excavant from an excavation, and for separating excavant from entraining air. The present invention increases productivity while reducing complexity and cost of operation. Furthermore the excavant is trapped and enclosed in the system preventing discharge of dust, spread of excavant fragments, and run-off of toxic liquid.

Other advantages and contributions are considered in more detail in describing the accompanying drawings, in which.

Figure 1:
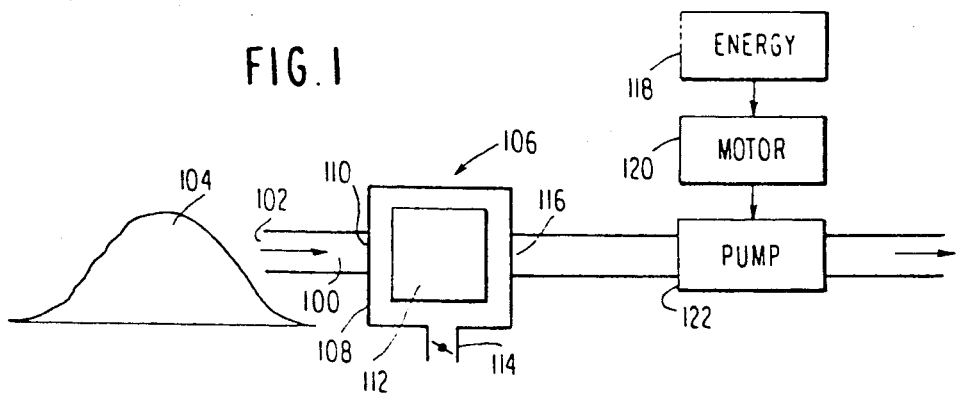
FIG. 1 is a diagrammatic presentation of the excavation system of the invention.

Long enclosed flow path 100 in FIG. 1 has vacuum-intake end 102 open to the atmosphere in communication with excavant 104. Air flows into the intake end and through the enclosed flow path with sufficiently high velocity to entrain and pneumatically convey excavant into communication with separator 106.

Separator shell 108 defines an enclosure into which air conveying entrained excavant flows through entrance 110, and separation apparatus 112 within the enclosure removes the excavant from the air. Discharge means 114 enables the excavant to be removed from the enclosure. Air flowing out of the separator through exit 116 entrains less of such excavant, then air flowing into such separator.

Separator 106 may include multiple stages of separation apparatus such as settling chambers, cyclone chambers, or filter apparatus; and may include excavant storage chambers. The discharge means could be any means for periodically or continuously removing excavant from the separator (eg. controls to reduce, reverse or stop air flow; and/or valve or access doors to remove excavant, clean filters, replace filters).

Source of energy 118 provides energy to motor 120 which converts energy into rotary motion for air pump 122 which transfers the rotary motion to move the air through the enclosed flow path at such sufficient velocity.

Pumps capable of moving large volumes of air at such velocity through separators include, for example, turbines and lobe-type positive displacement pumps, and may be powered directly by the engine of a vehicle carrying the pump or by a separate internal combustion engine utilizing a fluid fuel. For example, a 40 HP (30,000 watt) motor is adequate to drive a lobe-type positive-displacement air pump to convey fragments of excavant and air at 800 CFM (813 l/s) (through a 4 to 6 in (100 to 150 mm) flexible conduit to a 4 ft (1.2 m) diameter high-efficiency cyclonic centrifugal separator.

Additional separators may be included, and may communicate with the air flow either before or after the pump. Each separator may include different combinations of such separation apparatus stages, and may be serially arranged in relation to the flow path and to each other, and may be sorted in the direction of flow such that each subsequent stage removes smaller sized particles of fragmented excavant. At least one separator should communicate with the air traveling through the flow path before it reaches the pump in order to prevent any excavant large enough to damage the pump from reaching the pump; or the size of the excavant must otherwise be controlled.

Figure 2:
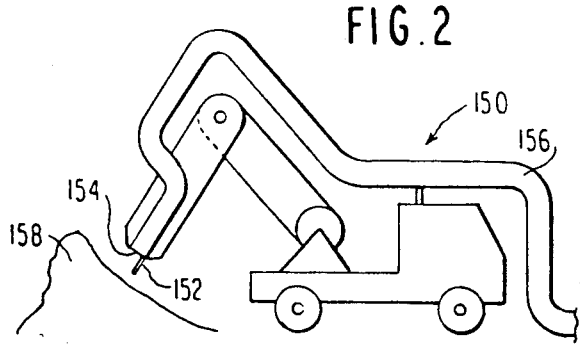
FIGS. 2 is a schematic representation of a continuous digging machine which sufficiently fragments excavant for pneumatic conveyance and which positions the vacuum intake end of a conduit in communication with the excavant.
Figure 3:
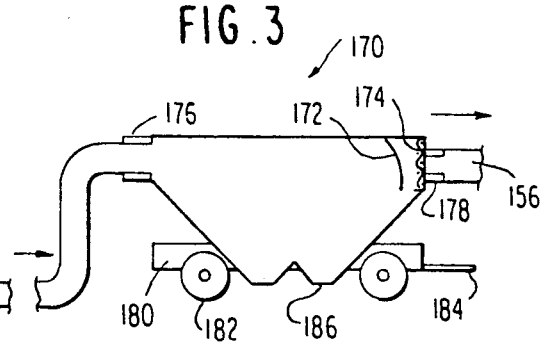
FIG. 3 illustrates a settling chamber for gravitational separation and excavant collection and which utilizes a trailer for transporting such excavant.
Figure 4:
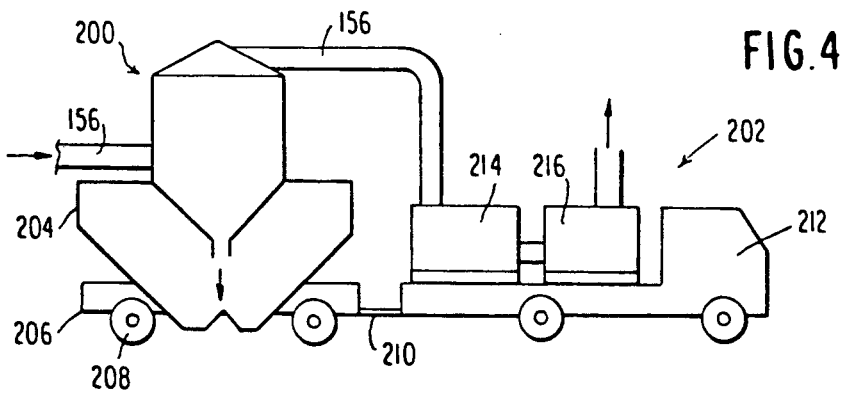
FIG. 4 is a schematic representation of the high-efficiency cyclone separator, air pump, and HEPA filter of the system of the invention which utilizes a truck and trailer for transportation.

A preferred embodiment of the system is illustrated in FIGS. 2, 3, and 4. Excavation machine 150 of FIG. 2 includes fragmenting means 152 to generate excavant fragments sized sufficiently small for pneumatic conveyance, and means to move vacuum-intake end 154 of conduit 156 into communication with excavant 158 to entrain such excavant.

Such fragmenting means may include, for example, mechanical (eg. auger, blade, pick, or shovel), explosive, and/or hydraulic means to fragment excavant, depending upon volume requirements and the nature of the excavant. For example, at a small excavation a pick or shovel could break up soil and a flexible vacuum conduit could be manually positioned in communication with the fragmented excavant for transportation away from the excavation.

Separator 170 in FIG. 3 contains a settling chamber providing a region of low-velocity air to enable gravity to separate such excavant from such entraining air, and communicates serially with conduit 156. The separator is positioned at a site as remote from the excavation as desirable for preventing interference with work at the excavation, for convenient transporting to and from an excavant disposal/storage site, and/or for minimizing flow-resistance through the conduit for proper operation. Separation apparatus within the separator include baffle 172 to distribute the air; and relatively coarse filter 174 which prevent larger fragments from exiting the separator.

Connection means 176 at the air entrance, and 178 at the air exit enable the separator to be disconnected from the system for transporting collected excavant to a disposal/storage site where collected excavant is removed from such chamber, then returned and reconnected for subsequent excavant separation. The separator is permanently mounted on a trailer with frame 180, wheels 182, and hitch 184 for attachment to another vehicle such as a truck to drive the trailer. Discharge means 186 are controllable to enable opening at the disposal/storage site to remove collected excavant, and closing for collection and transportation of excavant.

Typically the exit filter is a screen with apertures. Such filter prevents any excavant larger than such apertures from exiting from the settling chamber. Entrance and exit connections may be slip joints with clamps or other joint means sufficient to provide convenient connection/disconnection and to prevent leaks. Discharge means may include, for example, valves, gates, doors, or other control means which may be bottom mounted, or co-act with means to tilt the chamber for gravity discharge; or which may co-act with pneumatic conveyance means, or other means for removing excavant.

The addition of such settling chamber to the pneumatic excavation system results in increased separation efficiency and more convenient operation. Utilization of a settling chamber allows cyclone design to be optimized for removing the decreased quantity of smaller sized fragments more efficiently. The settling chamber can be positioned at an accessible location for convenient transportation to and from the excavant disposal/storage site; and the cyclone separator positioned at a less accessible location as desired for other purposes (eg. convenience of excavation work).

High-efficiency cyclone separator 200 and flow inducing means 202 in FIG. 4 each communicate serially with conduit 156. They are positioned at a desirably remote location from the excavation and may be positioned as remote from the settling chamber as desired. Separator 200 includes a collection chamber 204 and is permanently mounted to a trailer with frame 206, wheels 208, and hitch 210 which may be connected to truck 212 for transportation to the disposal/storage site.

Flow means 202 induces air travel through conduit 156, and includes pump unit 214 shown on truck 212 as a single package containing a source of energy, a motor, and an air pump. Such unit packaging enables convenient unloading /reloading of the unit at the collection site. The air flows through HEPA filter unit 214 to remove very fine particles and toxic gases from the entraining air; then through pump unit 216 and finally is discharged into the atmosphere.

The high-efficiency cyclone separator may include multiple cyclone stages and/or one or more stages of filter apparatus to increase separation efficiency. The HEPA filter is required where toxic or radioactive substances in gases or fine dust must be removed from the air before discharge into the atmosphere.

Thus the excavation system of the invention encloses the excavants, preventing their spread into the environment and isolating them from workers at the excavation site.

Figure 5:
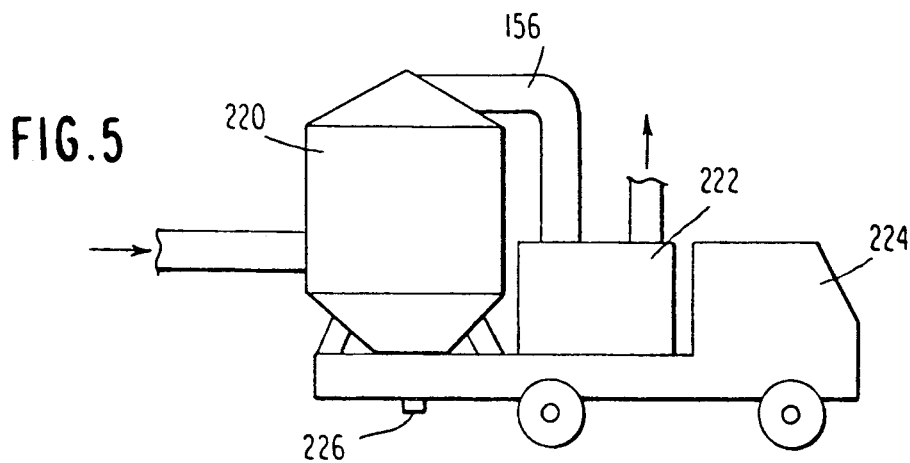
FIG. 5 illustrates another embodiment in which a truck is utilized for transporting the cyclone separator and air pump.

In another embodiment, shown in FIG. 5, a high-efficiency cyclone separator 220 and pump 222 are permanently mounted on truck 224. Excavant collects in the bottom of the lower cyclone chamber and can be removed through discharge means 226.

Where excavant is fragmented manually or is already fragmented such as sand or gravel one operator can transport the entire system in one trip. The trailer of FIG. 3 may be attached to such truck for such trip.

In addition to discharge means discussed above, excavant may be, for example, discharged locally during collection by controlling the pump motor to reduce the vacuum in the chamber sufficiently to enable the weight of the excavant to discharge the excavant when a control means such as a valve or door at the bottom of the chamber is opened.

The above embodiments are sufficient to enable one skilled in the art to select a convenient arrangement for transporting the pumping and separation equipment using combinations of vehicles and permanent or packaged systems for convenient use of the invention.

Figure 6:
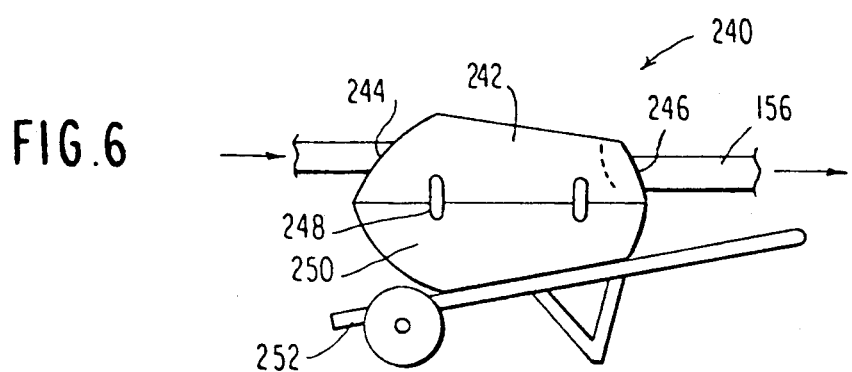
FIG. 6 illustrates another embodiment of the settling chamber in which a wheelbarrow is utilized for transporting excavant.
Figure 7:
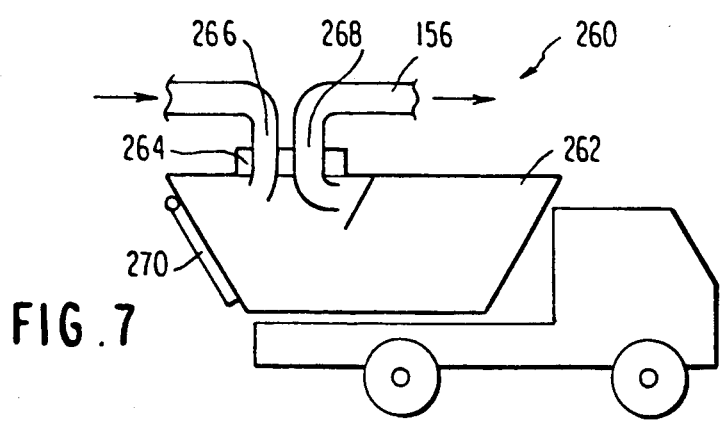
FIG. 7 illustrates another embodiment of the settling chamber in which a dump-truck is utilized for transporting excavant.

Other embodiments of the settling chamber are shown in FIGS. 6 and 7. Wheelbarrow 240 in FIG. 6 can be used as a settling chamber when the volume of excavant is relatively small. Conduit interface 242 connects conduit 156 to air entrance 244 and air exit 246. The interface includes clamps 248 for holding the interface to pan 250 of the wheelbarrow to form an air tight chamber for collection and for convenient clasping/unclasping. When the wheelbarrow is filled, the interface is unclamped; the wheelbarrow is pushed to the disposal/storage site and balanced on discharger 252 for emptying; then the wheelbarrow is returned to the collection site and reconnected to the interface for subsequent excavant collection.

Dump-truck 260 in FIG. 7 includes enclosed bucket 262 utilized as a settling chamber. Conduit interface 264 connects conduit 156 to air entrance 264 and air exit 268. The interface can be removed enabling the truck to travel to an excavant disposal/storage site where door 270 is opened and the bucket tips to dump the collected excavant. Then the door seals closed and the truck returns to the collection site where the interface is reattached to the bucket for continued excavant collection.

Figure 8:
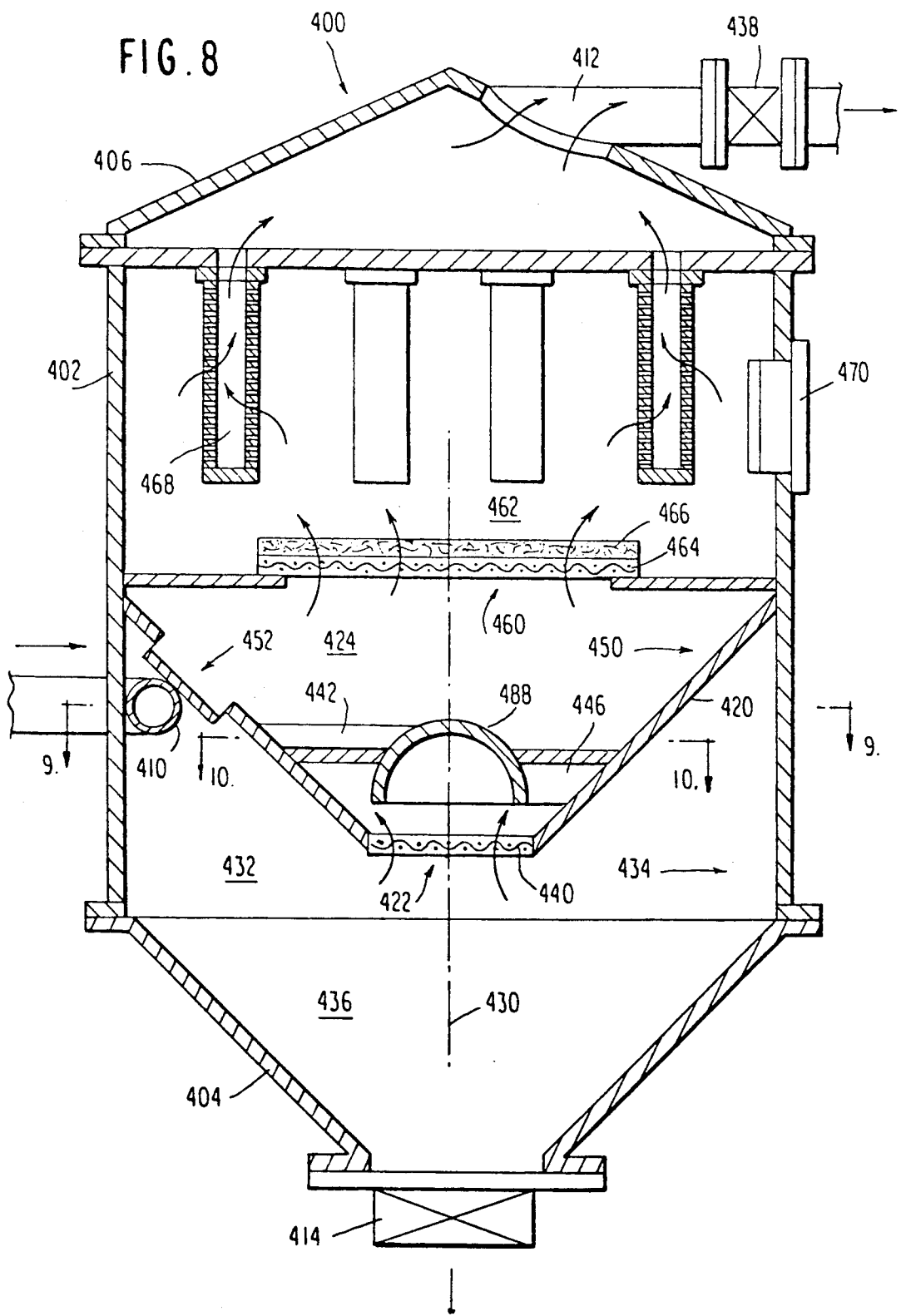
FIG. 8 is an elevation view partially in cross-section of the high-efficiency cyclone separator of the invention.
Figure 9:
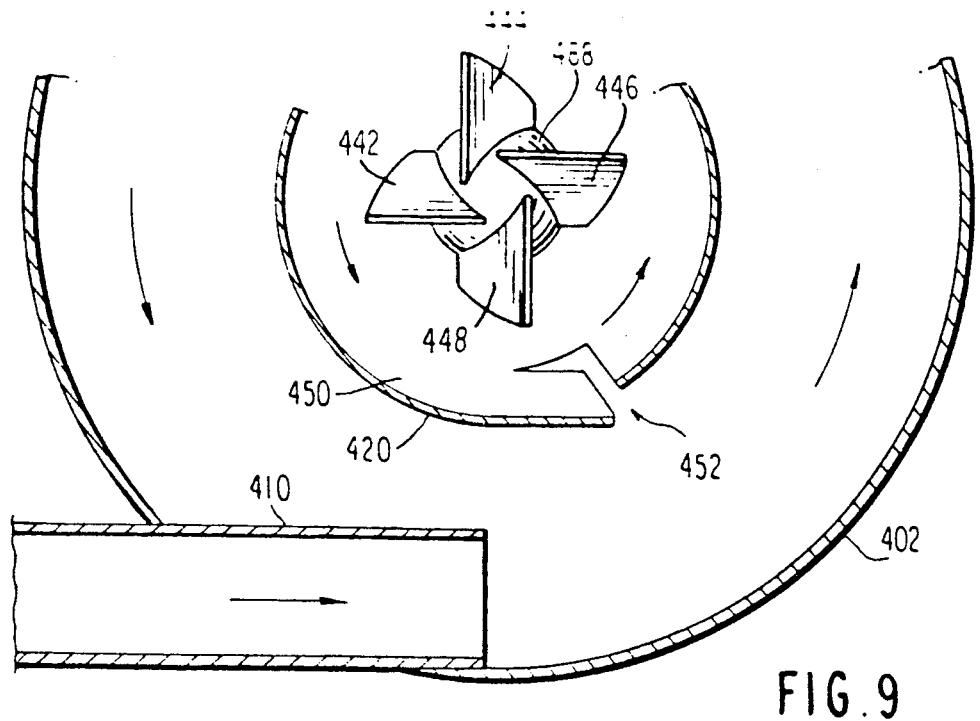
FIG. 9 is a sectional, partial plan-view illustrating the tangential entry, excavant discharge, and angled vanes of the high-efficiency cyclone of FIG. 8.
Figure 10:
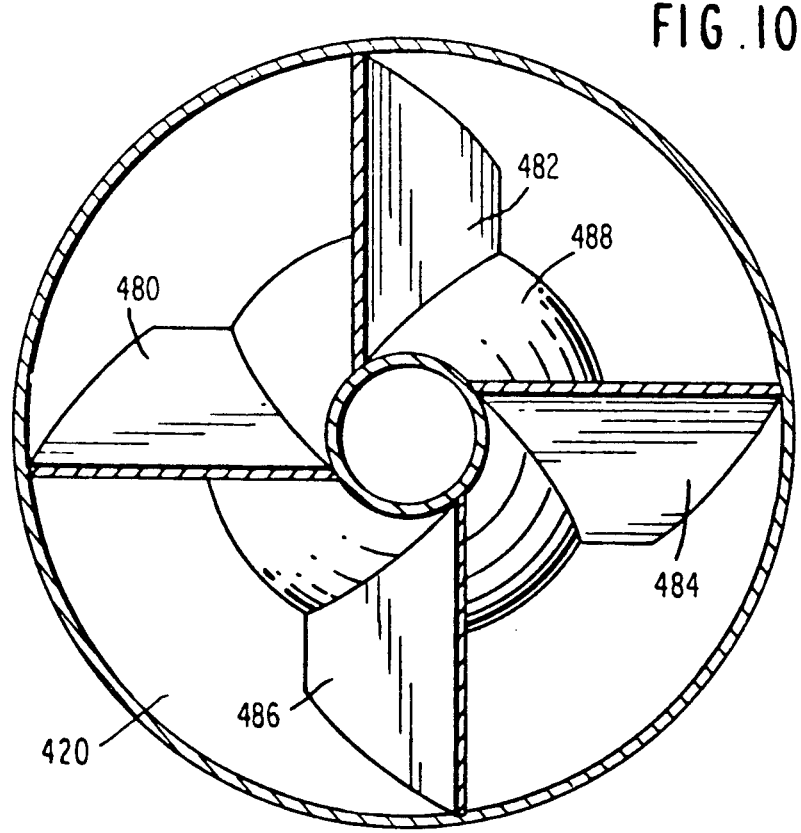
FIG. 10 is a sectional plan view of the angled vanes of the high-efficiency cyclone of FIG. 8.

High-efficiency cyclone separator 400 of the invention is illustrated in FIGS. 8, 9, and 10. Vertical cylindrical wall section 402; bottom conical wall section 404 with depressed apex; and top conical section 406 with raised apex define an air tight enclosure. Such excavant and such entraining air flow into the separator through entrance 410, and segregated air, entraining less excavant than the air entering the separator, flows out of the separator through exit 412. Excavant collected in the bottom conical section of the separator is discharged through an aperture at the bottom of the separator controlled by flapper valve 414.

The separator is horizontally divided into two cyclone chambers by conical boundary wall 420 with depressed apex. Air passes from the lower chamber to the upper chamber through aperture 422 at the bottom of the boundary wall. Each chamber is an aerodynamically smooth region about the central axis of separator 424 in order to maintain a vortex with high circumferential air velocity about such axis for high-efficiency centrifugal separation with minimal flow-resistance.

Air flows tangentially, in relation to vertical central axis 430 of the separator (best seen in FIG. 9), into lower chamber 432. The tangential flow induces the high speed circumferential air flow to provide a vortex rotating about the central vertical axis of the lower cyclone chamber for centrifugally segregating excavant toward the radial periphery of the vortex at 434, and segregating clean air toward the central axis.

The excavant at the radial periphery of the lower cyclone chamber falls down along the interior surface of longitudinal side walls 402 of the separator and collects at the bottom of conical bottom region 436. The excavant is discharged by sufficiently equalizing the pressure differential between the interior of the cyclone separator and the atmosphere such that upon opening flapper valve 412 the weight of the excavant will be sufficient to discharge the excavant out through the valve. Such pressure equalization can be accomplished, for example, by controlling the air pump motor or by closing valve 438 in the conduit between the separator and the air pump.

Separated air flows from the central region of the bottom chamber through passage 422 into upper cyclone chamber 424. Filter stage 440 is a coarse screen across the passage which prevents larger fragments from leaving the lower chamber through the passage. Angled vanes 442,444,446,448 (see FIGS. 9 and 10) across passage 422 deflect the air to spin about central axis 430 to induce a high speed upper vortex for centrifugally segregating excavant to the radial periphery of the vortex at 450, and directing the segregated clean air toward the central axis.

In order to prevent collection of fine excavant in the upper chamber, a protruding venturi vent 452 is provided in boundary wall 420 to discharge excavant from the upper chamber into the lower cyclone chamber. The vent is a flap of the wall cut along the top, bottom, and one side and bent outward to form a vertical opening between the upper and lower cyclone chambers. The vent is positioned such that air flowing into the lower chamber through entrance 410 blows across the protruding vent resulting in a venturi effect forming a region of low pressure in the lower chamber to suck fine particle fragments of excavant from upper chamber at 450 through the vent into the lower chamber for separation and collection in conical bottom region 436.

In the preferred embodiment the coarse screen is a wire mesh with ¼ in (6 mm) spacing; and a slit 3 in (8 cm) long and ⅛ in (2 mm) wide which has proved sufficient for providing a venturi effect and for removing excavant particles from the upper chamber.

Separated air flows from the center of the upper cyclone chamber up through air way 460 into filter chamber 462. The air flows through a two stage filter across the air way. First filter stage 464 is a fine mesh screen to prevent all but the smallest particles from exiting the upper chamber. Second filter stage 466 is a replaceable foam or fiberglass element for capturing particles that pass through the fine mesh screen. Then the air flows through vertical candle-type bag filters 468 which capture any very fine dust which remain in the air flow, and the air flows out through separator exit 412.

Thus the stages of filter apparatus are arranged in serial relation to the flow path and to each other in the flow path; each stage provides a different minimum passable particle size; and the filter stages are sorted in the direction of flow in order of decreasing minimum passable particle size to maximize the period of operation between shutdowns for filter maintenance. The above filter arrangement has proved convenient and economical; however, different filter types known in the art could be arranged as a substitute for the disclosed filter arrangement.

Doorway 470 provides access into filter chamber 462 for periodically cleaning the bag and screen filters by blowing air and replacing the foam or fiberglass filter element as required.

Angled vanes 480,482,484,486 in FIG. 10 are welded between conical deflector 488 and the inside of boundary wall 420. The vanes are angled to deflect the air circumferentially about the vertical central axis of upper chamber 430 in FIG. 8 for inducing a high speed vortex rotating about the central axis in the upper cyclone chamber.

The addition of such boundary wall with deflecting vanes has proved to be an economical means for increasing separation efficiency of a cyclone separator in an excavation system; thus extending the period of operation between shutdowns for filter maintenance.

While this excavation system invention has been specifically described with reference to preferred embodiments, it will be understood by those skilled in the art that changes in form and detail can depart from such embodiments without departing from the scope and spirit of the invention. For purposes of determining the scope of the invention, reference shall be had to the appended claims.

I claim:

1. Excavation system in which excavated material is entrained in a gas and pneumatically conveyed from an excavation site to a remote site comprising:

an elongated flexible conduit providing a flow path for conveying entrained excavated material having an open-end for introducing such material entrained in high velocity gas into such flow path, said conduit having a distal open end for discharging such gas into the ambient atmosphere;

means for inducing gas travel through such flow path with sufficient velocity to pneumatically convey such material, and one or more convex separators between said open end and said distal end in communication with the flow path, for separating such material from such gas, each including:

(i) an enclosure for controlling communication between contents of such enclosure at non-ambient pressures and the ambient atmosphere;

(ii) an entrance into such enclosure for such material and such entraining gas;

(iii) one or more stages of separation apparatus within such enclosure, each stage communicating with the flow path through the separator, for separating such material from such gas;

(iii) an exit from such enclosure for such gas conveying less of such material then such gas entering such enclosure; and (v) discharge means for removing such material separated from such gas at each such stage of separation apparatus from such enclosure; and in which:

at least one of such stages of separation apparatus of at least one of such convex separators is a cyclone separation stage for centrifugally separating the excavated material from the entraining gas, such cyclone stage including:

a cyclone region arranged for maintaining a gas vortex for high-efficiency separation with minimal flow-resistance;

an inlet into the cyclone region for such material and such gas flow;

flow directing means to induce such vortex in such region;

an outlet from the cyclone region for such gas conveying less of such material than such gas entering such region;

multiple stages of separation in serial communication, in relation to the flow of gas, through the separator.

2. The excavation system of claim 1, further including digging means for separating material from the earth and breaking up to the material for producing solid fragmented chunks of loose excavated material sized for entrainment in such flow path and for pneumatic conveyance through such flow path.

3. The excavation system of claim 1, further including vehicular means for transporting the excavation system enabling a single operator to transport such system to and from such excavation site in a single trip.

4. The excavation system of claim 1, in which at least one of such convex separators includes a filter stage for filtering such material from such gas.

5. Material transportation system in which excavated material is entrained in a gas and pneumatically conveyed to a remote site for separating such material from such gas, comprising:

an elongated enclosed flow path for conveying entrained material, having means to introduce such material for entraining in high velocity gas in such flow path;

means for inducing gas travel through such flow path with sufficient velocity to pneumatically convey such material; and one or more separators in communication with the flow path for separating such material from such gas, at least one including (i) a single substantially convex enclosure for controlling communication between contents of such enclosure at non-ambient pressures and the ambient atmosphere;

(ii) an entrance into such enclosure for such material and such entraining gas;

(iii) one or more stages of separation apparatus within such enclosure for separating such material from such gas;

(iii) an exit from such enclosure for such gas conveying less of such material than such gas entering such enclosure; and in which, at least one of such stages of separation of at least one of such convey separators is a cyclone separation stage for centrifugally separating the excavated material from the entraining gas, each such cyclone stage including a cyclone region arranged for maintaining a gas vortex for high-efficiency separation with minimal flow-resistance;

an inlet into the cyclone region for such material and such gas flow;

flow directing means to induce such vortex in such region; and an outlet from the cyclone region for such gas conveying less of such material than such gas entering such region; and at least one of such separators includes storage means within the enclosure for storing such material collected from one or more of such separation apparatus stages;

connection means to control communication between such storage means and such enclosed flow path for enabling separated transportation for such storage means without transporting the entire excavation system; and vehicular means for transporting such storage means from such remote site to a disposal/storage site for disposal/storage of the conveyed material.

6. Material transportation system in which material is entrained in a gas and pneumatically conveyed to a remote site for separating such material from such gas, comprising an elongated enclosed flow path for conveying entrained material having means to introduce such material for entrainment in high velocity gas in such flow path;

means for inducing gas travel through such flow path with sufficient velocity to pneumatically convey such material; and one or more separators in communication with the flow path for separating such material from such gas, at least one including (i) a single substantially convex enclosure for controlling communication between contents of such enclosure at non-ambient pressures and the ambient atmosphere;

(ii) an entrance into such enclosure for such material and such entraining gas;

(iii) one or more stages of separation apparatus within such enclosure for separating such material from such gas;

(iii) an exit from such enclosure for such gas conveying less of such material than such gas entering such enclosure; and in which, at least one of such stages of separation apparatus of at least one of such convex separators is a cyclone separation stage for centrifugally separating the excavated material from the entraining gas, each such cyclone stage including a cyclone region arranged for maintaining a gas vortex for high-efficiency separation with minimal flow-resistant;

an inlet into the cyclone region for such material and such gas flow;

flow directing means to induce said vortex in such region; and an outlet from the cyclone region for such gas conveying less of such material from such gas entering such region; and at least one of such stages of separation apparatus of at least one of such separators is a settling stage for enabling gravity to separate such material from such gas, each such settling stage including a settling region having a large area of flow for providing low-velocity gas flow to enable gravity to separate such material from such gas;

an inlet into the settling region for such material and such gas; and an outlet from the settling region for such gas conveying less of such material than such gas entering the settling region.

7. The excavation system of claim 6, in which
at least one of such stages of separation apparatus of such separator is a filter stage for filtering such material from such gas, and
such filter stage communicates with the outlet from a settling stage so as to prevent large fragments of such material from departing the settling stage through such gas outlet.

8. The excavation system of claim 1 in which,
at least one of such convex separators include,
a plurality of cyclone stages,
and in which,
a plurality of such cyclone stages are arranged in series, in relation to such flow.

9. The excavation system of claim 8, in which,
the cyclone region of each such cyclone stage is defined by:
a vertical cylindrical side wall of the separator enclosure; and
at least one boundary wall within the separator between such cyclone regions.

10. The excavation system of claim 8, in which
at least one of such stages of separation apparatus of such separator is a filter stage for filtering such material from such gas.

11. The excavation system of claim 10 in which:
a plurality of such separation apparatus stages are such filter stages,
each such filter stage provides a different minimum passable particle size; and
each such filter stage is arranged in series in relation to such flow and sorted in the direction of such flow in order of decreasing minimum passable particle size so as to minimize filter maintenance.

12. The excavation system of claim 11, in which:
such flow path is a long flexible vacuum conduit;
such means for inducing gas travel through such flow path include:
(A) a source of energy,
(B) a motor to convert energy from such source of energy into rotary motion, and
(C) a gas pump utilizing such rotary motion to induce such gas travel through such flow path;
such system includes a first separator in series in relation to the flow path;
such separation apparatus stages of such first separator include a settling stage including:
a settling region having large area of flow for providing low-velocity gas flow to enable gravity to separate such material from such gas;
an inlet into the settling region for such material and such gas; and
an outlet from the settling region for such gas conveying less of such material than such gas entering the settling region;
such separation apparatus stages of such first separator include a filter stage for filtering to remove such material from such gas;
such filter stage of such first separator communicates with the outlet from such settling stage so as to prevent large fragments of such material from departing the settling stage through such outlet;
such system includes a second separator in series, in relation to the flow path positioned after such first separator;
such separation apparatus stages of such second separator include:
a first such cyclone stage for removing larger fragments of such material from such gas;
a first filter stage in communication with the outlet for gas from such first cyclone stage to prevent large fragments of such material from departing the first cyclone stage through such gas outlet;
a second such cyclone stage after the first cyclone stage in the direction of gas flow, for removing smaller fragments of such material from such gas remaining after such separation in the first cyclone stage;
a second filter stage in communication with the outlet for gas from such second cyclone stage for preventing large fragments of such material from departing the second cyclone stage through such gas outlet, and to separate and collect such material particles that remain in such gas after such first and second cyclone stages; and
a third filter stage communicating with the gas exit from the separator for separating and collecting such material which remains entrained in gas after passing through the second filter stage so as to prevent discharge of such material into the environment;
such discharge means of such first and second separators, further include:
storage means within the enclosure for storing such material collected from one or more of such separation apparatus stages;
controllable emptying means to enable removal of such material from such storage means only when desired and to prevent such removal when not desired; and
connection means to control communication between such storage means and such enclosed flow path for enabling separated transportation of such storage means without transporting the entire excavation system;

such first filter stage of such first separator includes
a flat web with multiple apertures of equal size for flow of such entraining gas through the web transverse to the web in order to prevent fragments of such material from escaping through the web;

such second filter stage of such second separator includes
a flat web with multiple apertures of equal size, which are smaller than the apertures of the first filter web, for flow of such entraining gas through the web transverse to the web in order to prevent particles of such material from escaping through the web; and
a flat web of filtration element for trapping such material entrained in such gas flowing through the element transverse to the element;

such third filter stage of such second separator includes
multiple elongated vertical rigid bag filters, in parallel communication with such flow path, for trapping such material entrained in such gas flowing radially into a longitudinal side of such filters;

such second separator further includes:
means to periodically blow high velocity gas in communication with each of said bag filters to clean said filters;
access means for periodically cleaning or replacing such flat web filtration element; and such excavation system further includes:
vehicular means for transporting the excavation system which enable a single operator to:
transport such system in a single trip to such excavation site and in a single trip from such excavation site, and
periodically transport such storage means from such remote site to a disposal/storage site for removing such stored material and then to the remote site for subsequent collection of such material.

13. High-efficiency cyclone separation chamber for centrifugally separating material from gas in which such material is entrained for pneumatic conveyance, comprising in combination:
an enclosure defining a chamber for controlling communication between the chamber and exterior environments, and which defines a top and bottom of the chamber;
a cyclone region within such chamber for maintaining a vortex rotating about a vertical axis of the region at a high circumferential velocity and with minimal flow-resistance for high-efficiency centrifugal separation of such material toward the radial exterior of the cyclone region, and separating gas toward the central axis of such region;
an inlet into the chamber at the bottom of the chamber for such material and such entraining gas;
flow directing means to induce such vortex within such cyclone region;
discharge means to remove such material separated from such gas out of the chamber; and
an outlet out of the chamber at the top of the chamber for gas conveying less of such material than such gas flowing into the chamber.

14. The separation chamber of claim 13, in which discharge means include,
a discharge vent in communication with the radial exterior of the cyclone region to discharge, continuously during chamber operation, such material centrifugally removed from such gas flow, out of the chamber through such vent.

15. The separation chamber of claim 13, in which flow directing means to induce such vortex comprise
angled vanes in communication with the gas at the gas inlet to rotate the gas about the central axis of the cyclone region at a sufficiently high tangential velocity for high-efficiency separation.

16. The separation chamber of claim 15, in which the bottom of the cyclone region comprises,
a conical wall section with a depressed apex at the bottom of the chamber having an aperture at the apex for such inlet for gas into the chamber.

17. The separation chamber of claim 13, further including
at least one stage of filter apparatus in communication with the flow of gas through the chamber for filtering such material from such gas.

18. The separation chamber of claim 13, further including:
multiple separate stages of filter apparatus for filtering such material from such gas in which
each filter stage is in separate communication with the flow of gas through the chamber;
each filter stage provides a different minimum passable particle size;
such stages are arranged in series in relation to such flow; and
such stages are sorted in the direction of flow in order of decreasing minimum passable particle size so as to minimize filter maintenance.

19. The separation chamber of claim 18, in which:
a screen filter is positioned in communication with the gas inlet to prevent large fragments of such material from entering the chamber, and comprising a web with apertures of equal size arranged to enable entraining gas to flow through the web transverse to the web;
particle entrapping filter apparatus communicates with the gas outlet from the chamber for separating particles that pass through the cyclone region;
flow directing means to induce such gas vortex, include angled vanes in communication with the flow of gas at the gas inlet to rotate the gas about the central axis of the cyclone region; and
such discharge means include, a material discharge vent in communication with the exterior of the cyclone region to discharge such material, centrifugally removed from the entraining gas, from the separation chamber through the vent to a region of lower pressure.

20. High-efficiency cyclone separator for centrifugally separating material from gas in which such material is entrained for pneumatic conveyance, comprising, in combination:
a single substantially convex enclosure for controlling communication between contents of such enclosure and the atmosphere;
an entrance into the enclosure for such material and such entraining gas;
an exit out of the enclosure for such gas conveying less of such material than such gas entering the enclosure;

one or more boundary walls within the enclosure to define separate chambers;

a plurality of cyclone regions each within a separate cyclone chamber, for maintaining a vortex rotating about the axis for high-efficiency separation with minimal flow-resistance for centrifugally separating such material from an entraining gas toward the radial exterior of the cyclone region and separating such gas toward the radial center of the cyclone region;

passage means connecting between adjacent chamber for directing gas travel between from chamber to chamber each passage defining a gas outlet from one chamber and a gas inlet into the adjacent chamber;

flow directing means to induce said vortex within each cyclone region;

discharge means to remove such separated material at each cyclone stage from the separator;

and in which, the gas outlet from each cyclone region is located near the central axis of the region to minimize the carryover of such material.

21. The separator of claim 20, in which:

such passage means, include:

a conduit from a gas outlet located near the central-longitudinal-axis into a gas inlet located near the radial exterior of the cyclone region of an adjacent chamber; and in which such flow directing means, include directing the outlet of the conduit tangentially about the central axis of the cyclone region to induce such vortex.

22. The multi-cyclone separator of claim 20, in which:

the enclosure shell includes a desirably aerodynamic circumferential wall about a central-longitudinal-axis, and a wall at each longitudinal end of the enclosure;

at least one longitudinal-boundary wall partitions the enclosure into multiple longitudinally adjacent chambers;

such plurality of cyclone regions are each defined by such a chamber with such desired aerodynamic shape for maintaining such vortex rotating about the central-longitudinal-axis of the enclosure with minimal flow-resistance.

23. The multi-cyclone separator of claim 22, in which:

the central-longitudinal-axis of the enclosure is vertical and defines the central-longitudinal-axis of each chamber;

each boundary wall horizontally partitions the enclosure into vertically adjacent chambers;

such material and such gas flow through the separator entrance into the lowest chamber, then serially through passages between adjacent chambers, and then such gas flows out through the separator exit from the top chamber.

24. The multi-cyclone separator of claim 23, in which boundary walls between cyclone chambers each comprise, a conical section with depressed apex defining the bottom of the cyclone region of each cyclone chamber, and the bottom wall of the enclosure comprises a conical section with depressed apex defining the bottom of the lowest cyclone chamber.

25. The separator of claim 22, in which:

passage means between adjacent cyclone chambers comprises, an aperture centrally located in the boundary wall at the central-longitudinal-axis of the enclosure, and each such passage means into a cyclone region communicates with flow directing means comprising angled vanes positioned across the outlet of such passage means to induce a vortex in each in such cyclone region.

26. The multi-cyclone separator of claim 20, which further includes filter apparatus within the enclosure for filtering such material from such gas.

27. The separator of claim 20, which further includes multiple stages of filter apparatus positioned within the enclosure for filtering such material from such gas; and in which:

each filter stage is in separate communication with the flow of gas through the enclosure;

each filter stage provides a different minimum passable particle size;

the stages of filter apparatus are arranged in serial relation within the gas flow through the separator; and the stages of filter apparatus are sorted in the direction of flow in order of decreasing minimum passable particle size so as to minimize filter maintenance.

28. The separator of claim 27 in which, such stages of filter apparatus include:

one screen filter apparatus stage positioned across the gas outlet from each cyclone chamber, and in which each such screen filter apparatus stage comprises a web with apertures of equal size through which such gas flows transverse to the web in order that fragments of such material entrained in such gas and larger than such apertures can not exit from such cyclone chamber.

29. Separation and collection apparatus including an evacuable settling chamber for enabling gravity to separate material from an entraining gas pneumatically conveying such material comprising in combination:

an enclosure defining a chamber for controlling communication between the chamber and the ambient atmosphere;

a settling region within the chamber having a large area of flow in order to provide a region of low gas velocity for enabling gravity to separate such material from entraining gas, and for storing such separated material;

at least one entrance from an intake vacuum conduit means into the chamber for such material and such entraining gas flowing from a remote source of material and entraining gas;

at least one exit from the chamber into an outlet vacuum conduit means and conveying less of such material than such gas entering such chamber for gas flowing towards a remote source of vacuum;

connection means to connect and disconnect the intake and outlet vacuum conduit means communicating with the chamber;

vehicular means for periodically transporting the chamber from the collecting location to a location for emptying the chamber and back to the collecting location;

emptying means for removing such stored material from the chamber at the location for emptying.

30. The collection apparatus of claim 29, in which the chamber further includes
  separation apparatus in communication with the gas exit of the chamber to reduce the quantity of such material departing from the chamber through the gas exit.

31. The collection apparatus of claim 30, in which such separation apparatus includes,
  deflector means to prevent large fragments of such material from flying directly from the gas entrance into the gas exit to depart from the chamber through the gas exit.

32. The collection apparatus of claim 30, in which such separation apparatus includes,
  screen filter apparatus comprising a web with apertures of equal size positioned across the gas exit such that gas flows through the filter transverse to the web in order that fragments of such material larger than the aperture size can not exit from the settling chamber through the gas exit.

33. The remote collection apparatus of claim 30, in which separation apparatus includes,
  internal baffles positioned to increase the separation efficiency of the settling chamber.

34. The collection apparatus of claim 29, in which vehicular means include,
  driving means to provide force to move the vehicle; and
  one or more wheels to reduce the amount of force required for such moving.

35. The collection apparatus of claim 29, in which connection means comprise:
  a single conduit interface with forms part of the enclosure and which is connected to each intake and outlet vacuum conduit means; and
  means to connect and disconnect the conduit interface from the chamber to facilitate transporting the chamber without disconnecting each conduit means from the conduit interface.

36. The remote collection apparatus of claim 35, in which said vehicular means comprise:
  a wheelbarrow in which,
  the pan of the wheelbarrow forms the bottom of the enclosure and the conduit interface forms a top for the enclosure.

37. The collection apparatus of claim 29, in which vehicular means comprise
  permanently mounting the settling chamber on a trailer in which
  multiple wheels support the trailer; and
  driving means include hitch means integral with the trailer for utilizing a second vehicle which is self-powered to pull the trailer.

38. The collection apparatus of claim 29, in which vehicular means comprise
  a dump truck with an enclosed bucket having a rear door sealable for such vacuum collection, and openable for such emptying.

39. A method of digging into the earth, utilizing an excavation system in which excavated material is entrained in a gas and pneumatically conveyed from the hole to a desirably remote location for separating such material from such gas, including the steps of:
  supplying energy to a motor communicating with pump means for inducing a gas to travel through an elongated flow path with a sufficiently high velocity to pneumatically convey entrained excavated material through such flow path;
  positioning the open vacuum end of the flow path in communication with loose excavant for entraining such material in such high velocity gas drawn into such end of such flow path;
  pneumatically conveying such material entrained in such gas through the elongated flow path from the hole into communication with one or more separators for separating such excavated material from such gas flow;
  at least one step of separating such excavated material from such gas flow including at least one step of centrifugal separation which utilizes high-efficiency cyclone separation;
  discharging such gas from which such material has been removed from an open discharge end of the flow path into the atmosphere; and
  discharging such material, separated at each separation step, from each such separator.

40. The method of excavation of claim 39 further including the step of,
  breaking chunks of material from the earth to produce fragmented chunks of loose excavated material sized for such entraining and pneumatic conveyance of such material from the hole upward through the flow path.

41. The method of excavation of claim 39, further including the steps of:
  transporting the excavation system to the vicinity of the excavation utilizing means to enable one operator to control such transportation and to enable such transportation in one trip;
  transporting the evacuation system away from the vicinity of the evacuation utilizing means to enable one operator to control such transportation and to enable such transportation in one trip.

42. The method of excavation of claim 39 in which,
  separating such material from such gas includes multiple separation steps, including the steps of,
  gravitationally separating excavated material from such gas in a low gas velocity settling chamber to collect such material in such chamber.

43. Method of pneumatically conveying material entrained in a gas, including the steps of:
  supplying energy to a motor communicating with pump means for inducing a gas to travel through an elongated flow path with a sufficiently high velocity to pneumatically convey entrained material through such flow path;
  entraining such material in such high velocity gas;
  pneumatically conveying, by way of a pneumatic system such material entrained in such gas through the enclosed flow path from an intake end into communication with one or more separators for separating such material from such gas;
  at least one step of separating such material from such gas including at least one step of centrifugal separation which utilizes high-efficiency cyclone separation;
  storing the separated material utilizing collection means at the remote site;
  disconnecting collection means from the pneumatic system;
  transporting such disconnected collection means to a disposal/storage site where such material is discharged from such collection means;
  transporting such collection means back to such remote site;

reconnecting such collection means to the pneumatic system.

44. The method of excavation of claim 39, in which, separating such material from such gas includes multiple separation steps, including the step of,
filtering such material from such gas.

45. The method of excavation of claim 39 in which, the step of separating such material from such gas includes multiple separation steps, including the step of,
filtering to remove very fine toxic particles and/or to adsorb toxic gases from the gas which entrains such excavated material.

46. The method of excavation of claim 39 in which, separating such material from such gas includes the following steps in order:
centrifugally separating such material from such gas utilizing a first high-efficiency cyclone apparatus stage; then
screening such material from such gas to prevent large fragments of such material from departing the first cyclone chamber through an outlet for gas; then
centrifugally separating such material from such gas utilizing a second high-efficiency cyclone apparatus stage; and then
filtering such material from such gas to collect such material particles that pass through the two cyclone stages so as to prevent discharge of such material into the environment.

47. Separation and collection apparatus including an evacuable settling chamber for enabling gravity to separate material from an entraining gas pneumatically conveying such material to a location for such collection, comprising:
an enclosure defining a chamber for controlling communication between the contents of the chamber at belowambient pressures and the ambient atmosphere;
a settling region within the chamber having a large area of flow in order to provide a region of low gas velocity for enabling gravity to separate material from entraining gas, and for collecting such separated material in storage means;
at least one entrance from an intake vacuum conduit means into the chamber for such material and entraining gas flowing from a remote source of material and gas;
at least one exit from the chamber into an outlet vacuum conduit means for gas conveying less of such material than such gas entering such chamber flowing toward a remote source of vacuum;
connection means to connect and disconnect the storage means from the pneumatic system;
vehicular means for transporting the storage means from the collecting location to a location for disposal/storage of the collected material.

48. A method of pneumatically conveying material entrained in a gas stream to a remote site and separating such material from such gas, including the steps of:
supplying energy to a motor communication with pump means for inducing a gas to travel through an elongated flow path with a sufficiently high velocity to pneumatically convey said material through such flow path;
entraining such material in such high velocity gas stream;
pneumatically conveying such material entrained in such gas stream through the enclosed flow path into communication with one or more separators at such desirably remote site for separating and collecting such material from such gas; and
multiple steps of separating such material from such gas, each such step occurring in a separate stage of separation apparatus which serially communicates with the gas stream, within such separators;
and in which:
at least one of such separation steps occurs at belowambient pressures;
a plurality of such separation steps occur at non-ambient pressures within one substantially convex separator; and
at lest one of such separation steps includes centrifugal separation which utilizes high-efficiency cyclone separation.

49. The method of pneumatically conveying material of claim 48, in which:
the steps of separating such material from such gas include:
a plurality of filtering steps; in which
each step utilizes a separate stage of filter apparatus;
each such separate stage of filter apparatus provides a different minimum passable particle size;
and further including the step of,
selectively positioning each stage of filter apparatus in the flow path sorted in the direction of flow in order of decreasing minimum passable particle size in order to minimize filter maintenance.

50. The method of pneumatically conveying material of claim 48 in which,
such centrifugal separation step includes,
at least two separate steps of,
centrifugally separating such material from such gas utilizing a separate high-efficiency cyclone apparatus stage, which communicates serially with the entraining flow for each such centrifugal separation step.

51. Cyclone separator for centrifugally separating excavated material from a gas stream in which such material is entrained for pneumatic conveyance, comprising:
an enclosure for controlling communication between enclosure contents at non-ambient pressures and the ambient atmosphere, including:
a generally cylindrical vertically oriented side wall;
a inverted frustro-conical floor with depressed apex for storing such material that has been separated from such gas; and
a roof;
a horizontally oriented dividing wall for vertically partitioning the enclosure and defining a bottom chamber and a second chamber;
inlet means for directing such gas entraining such material into the bottom chamber directed approximately horizontally and tangentially along the cylindrical side wall near the top of the bottom chamber to generate a vortex within the bottom chamber for separating gas toward the central-longitudinal-axis of the enclosure and separating such material toward the side wall of the enclosure and down to the enclosure floor;
a vertically oriented outlet for such material separated from such entraining gas out through the enclosure floor at such depressed apex;

valve means at such vertical floor outlet for periodically removing accumulated material stored on such frustro-conical floor;

passage means for directing the gas stream through the dividing wall, from the bottom chamber near the central-longitudinal-axis of the enclosure, into the second chamber positioned above the dividing wall;

flow rotation means for such gas stream located at such passage for inducing a vortex within the second chamber for separating material toward the side wall and entraining gas toward the central-longitudinal-axis of the enclosure;

outlet means for directing such gas stream from the second chamber near the central-longitudinal axis of the enclosure.

52. The separator of claim 51 in which, such horizontally oriented dividing wall has an inverted frustro-conical shape having such passage through the depressed apex thereof.

53. The separator of claim 51 in which, such material is removed from the second vortex chamber by periodically reducing the flow rate of gas through such stream to allow such material to slide down the frustroconical dividing wall and to fall through the passage to the bottom chamber floor.

54. The separator of claim 51 including, a discharge vent penetrating through the dividing wall across which such inlet means directs the gas stream resulting in a vacuum for drawing such separated material from the second chamber into the bottom chamber for separating such material to the floor of the bottom chamber.

55. The separator of claim 51 in which, flow rotation means to induce such vortex in the second chamber includes, multiple vanes angled to rotate the gas stream entering into the bottom of the second chamber to form a vortex for centrifugal separation in the second chamber.

56. The separator of claim 51 including, at least one stage of filter apparatus in communication with the flow of gas through the separator for filtering such material from such gas; and access means for cleaning and/or replacing filter apparatus.

57. The separator of claim 51 including, a second horizontally oriented dividing wall partitioning the enclosure to define a filter chamber above such second dividing wall; and a filter chamber exit means for directing the gas stream from the filter chamber out of the enclosure; and in which, such outlet means for directing the gas stream from the second vortex chamber directs the gas into the filter chamber.

58. The separator of claim 51 further including, multiple separate stages of filter apparatus for filtering such material from such gas in which:

each filter stage provides a different minimum passable particle size;

such stages are arranged in series in relation to such flow; and such stages are sorted in the direction of flow in order of decreasing minimum passable particle size so as to minimize filter maintenance.

59. Method for separation and collection in a pneumatic system utilizing a settling region in an evacuable enclosure for enabling gravity to separate material from an entraining gas pneumatically conveying such material to a location for such collection, comprising the steps of:

providing an enclosure for controlling communication between enclosure contents at below-ambient pressures and the ambient atmosphere, for providing a settling region having a large area of flow in order to provide a region of low gas velocity to enable gravity to separate material from entraining gas, and for providing means to store such separated material at enclosure pressures connected to such pneumatic system;

positioning the enclosure at a location which is desirably remote from a source of gas and loose material sized for pneumatic transportation;

connecting an intake vacuum conduit means to an entrance for such material and entraining gas into the enclosure;

connecting an outlet vacuum conduit means to an exit from such enclosure for conveying gas, entraining less of such material that such gas entering such enclosure, from the enclosure to a remote source of vacuum;

pneumatically conveying material from the source of gas and loose material through the inlet vacuum conduit means and into the gravity separation region for gravity separation of such material from such gas and for collecting such material in such storage means;

directing such gas out of the gravity separation region through outlet vacuum conduit means to a source of vacuum;

disconnecting such storage means from the pneumatic system;

transporting the storage means from the collecting location to a location for disposal/storage of the collected material.

60. The method of excavating utilizing an excavation system in which fragmented material is entrained in a gas and pneumatically conveyed through a flow path by a pump means to a desirably remote site for separating said material from said gas, including the steps of:

supplying energy to a motor communicating with said pump means for inducing a gas to travel through said flow path with a sufficiently high velocity to pneumatically convey entrained fragmented material through said flow path;

pneumatically conveying such material entrained in said gas through said flow path from an intake end into communication with the lower end of a separator for separating said material from said gas;

maintaining a vortex of said gas in said lower end wherein said entrained material is moved to the periphery of said separator and said gas is moved to a central position thereof;

directing said gas from said central position to an upper central region of the separator and out of the separator;

directing said separated material from the periphery of the separator out of the separator into a collection chamber, and discharging said gas from said central position to an open discharge end of said flow path into the atmosphere.

61. The invention of claim 60 wherein said method further includes
   collecting said material in said collection chamber;
   disconnecting said collection chamber from said excavation system;
   transporting said collection chamber to a disposal site where said material is discharged from said collection chamber;
   transporting said collection chamber back to said excavation system; and
   reconnecting said collection chamber to said excavation system.

* * * * *